Figure 1:
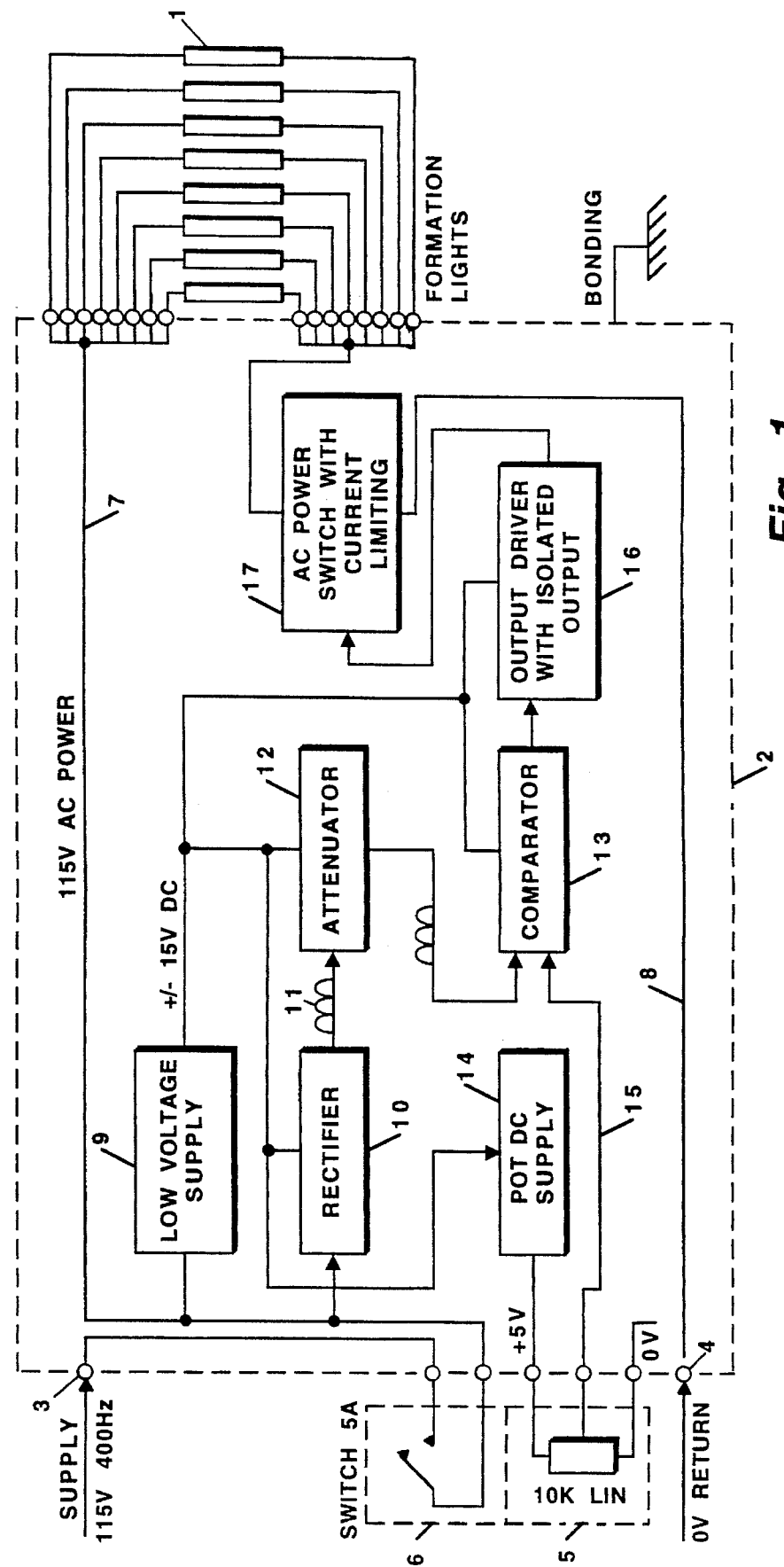

United States Patent [19]

Burns et al.

[11] Patent Number: 5,489,839
[45] Date of Patent: Feb. 6, 1996

[54] PULSED SWITCHING POWER SUPPLY FOR ELECTROLUMINESCENT LIGHT CENTERED ON ZERO-CROSSING

[75] Inventors: David G. Burns, Evesham; Victor L. Shannon, Cheltenham, both of United Kingdom

[73] Assignee: Ultra Electronics Limited, Greenford, United Kingdom

[21] Appl. No.: 211,877

[22] PCT Filed: Oct. 8, 1992

[86] PCT No.: PCT/GB92/01831

§ 371 Date: Apr. 22, 1994

§ 102(e) Date: Apr. 22, 1994

[87] PCT Pub. No.: WO93/08670

PCT Pub. Date: Apr. 29, 1993

[30] Foreign Application Priority Data

Oct. 23, 1991 [GB] United Kingdom ............... 9122506

[51] Int. Cl.⁶ ...................................... G05F 1/12
[52] U.S. Cl. ...................................... 323/244; 323/235
[58] Field of Search ......................... 323/247, 249, 323/237, 239, 235, 244

[56] References Cited

U.S. PATENT DOCUMENTS

| | | | |
|---|---|---|---|
| 4,904,906 | 2/1990 | Atherton et al. | 315/291 |
| 4,935,691 | 6/1990 | Lamar | 323/323 |
| 5,004,969 | 4/1991 | Schanin | 323/235 |

FOREIGN PATENT DOCUMENTS

| | | |
|---|---|---|
| 0311995 | 4/1989 | European Pat. Off. . |
| 0359245 | 3/1990 | European Pat. Off. . |
| 0420518 | 4/1991 | European Pat. Off. . |
| 2073510 | 10/1981 | United Kingdom . |
| 2121625 | 12/1983 | United Kingdom . |

*Primary Examiner*—Peter S. Wong
*Assistant Examiner*—Shawn Riley
*Attorney, Agent, or Firm*—Weingarten, Schurgin, Gagnebin & Hayes

[57] ABSTRACT

An A.C. power supply controller for a capacitive load such as an array of electroluminescent panels (1) having circuit elements (10 to 15) for producing a pulsed switching waveform (p) centered on the zero-crossing points (z) of an applied alternating voltage waveform, powerswitch (17) for connecting the applied voltage waveform or another voltage waveform to the load in response to the pulsed switching waveform (p), and control elements (5) for widening the pulse width of the switching waveform (p) symmetrically about the zero-crossing points (z) to vary the power applied to the load. The circuit elements (10 to 15) includes a rectifier (10) that rectifies the applied alternating voltage waveform, and a comparator (13) that compares the rectified waveform with a control D.C. input level (15) to produce an output level between adjacent crossing points of the two signals about the zero-crossing points (z). A linear potentiometer varies the D.C. input level (15).

8 Claims, 3 Drawing Sheets

PULSED SWITCHING POWER SUPPLY FOR ELECTROLUMINESCENT LIGHT CENTERED ON ZERO-CROSSING

This invention relates to an A.C. power supply controller for a capacitive load, particularly an electroluminescent light source, and a waveform generator suitable for use in such a controller.

Electroluminescent (EL) lights have been used as formation lights for military aircraft. The lights are situated on the aircraft such that they are visible to other aircraft only. The lights must be bright enough for the aircraft's position to be safely identified by other aircraft flying in a formation but not so bright as to be seen by hostile aircraft flying some distance away. The light must therefore be variable to cope with varying formation separation and weather conditions.

The lights present a highly capacitive load to power supply controllers, causing a large difference in the relative phases of the voltage and current in an A.C. supply. Former power supply controllers have taken the form of a variable transformer supplying a sinewave the amplitude of which can be varied. Variable transformers suffer the disadvantages of large physical size, weight and cost. Further, adjustment is achieved by movement of a wiper over coils which produces electrical noise, upsetting sensitive aircraft avionics. The problem of noise increases with age as dust becomes entrapped within the transformer.

It is an object of the invention to provide a power supply controller that is inexpensive to manufacture, compact, lightweight and produces a low level of electrical noise.

According to the invention there is provided an A.C. power supply controller for a capacitive load comprising means for producing a pulsed switching waveform centred on the zero-crossing points of an applied alternating voltage waveform, powerswitch means for connecting an applied voltage waveform to the load in response to the pulsed switching waveform, and means for widening the pulse width of the switching waveform symmetrically about the zero-crossing points to vary the power applied to the load.

According to a second aspect of the invention, there is provided a waveform generator for producing a pulsed waveform centred about the zero-crossing points of an input alternating waveform comprising means to rectify the input waveform and means to determine when the rectified waveform is below a particular value and to generate a non-zero waveform level when the rectified waveform is below said value.

Figure 2A:
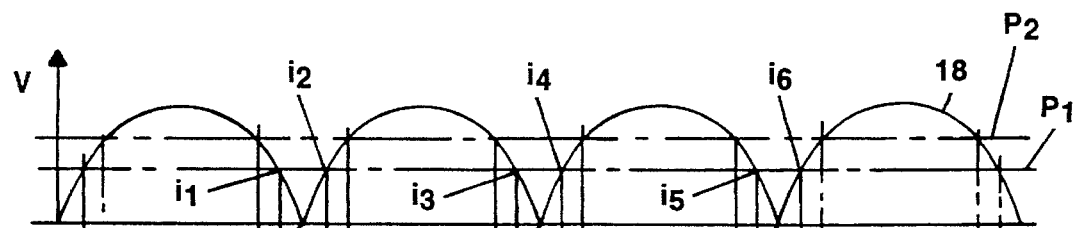
Figure 2B:
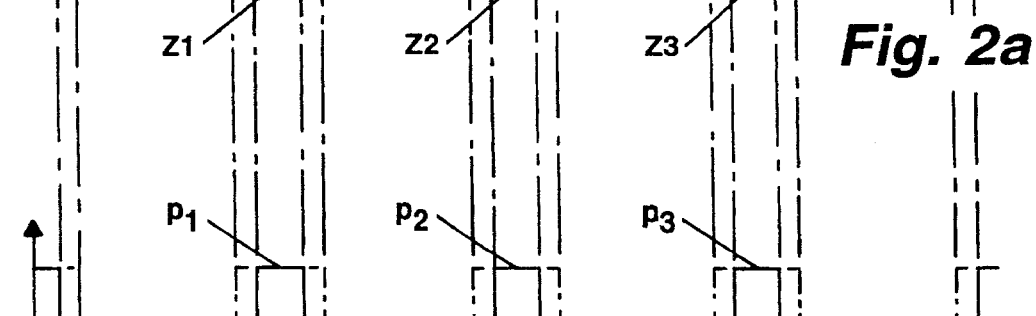
Figure 2C:
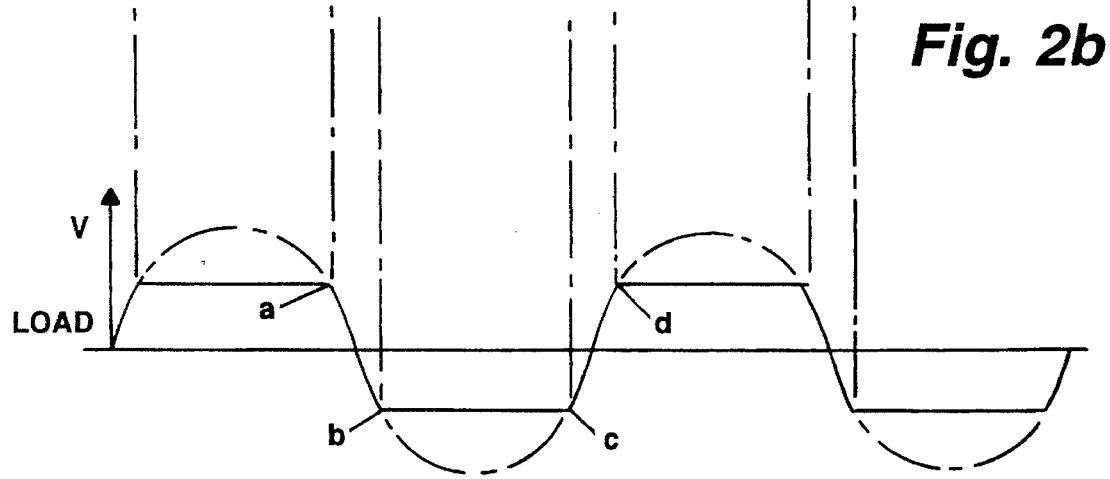
Figure 2D:
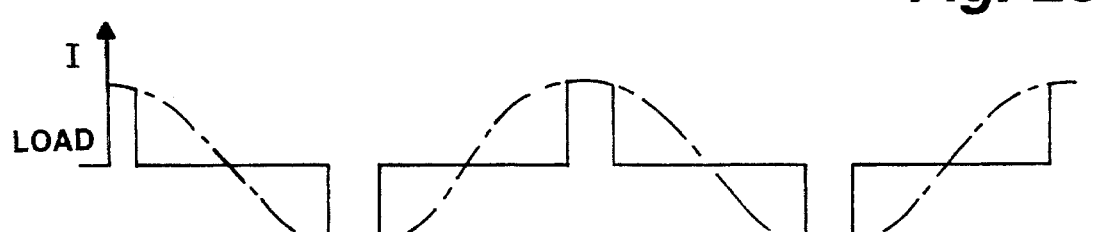
Figure 3:
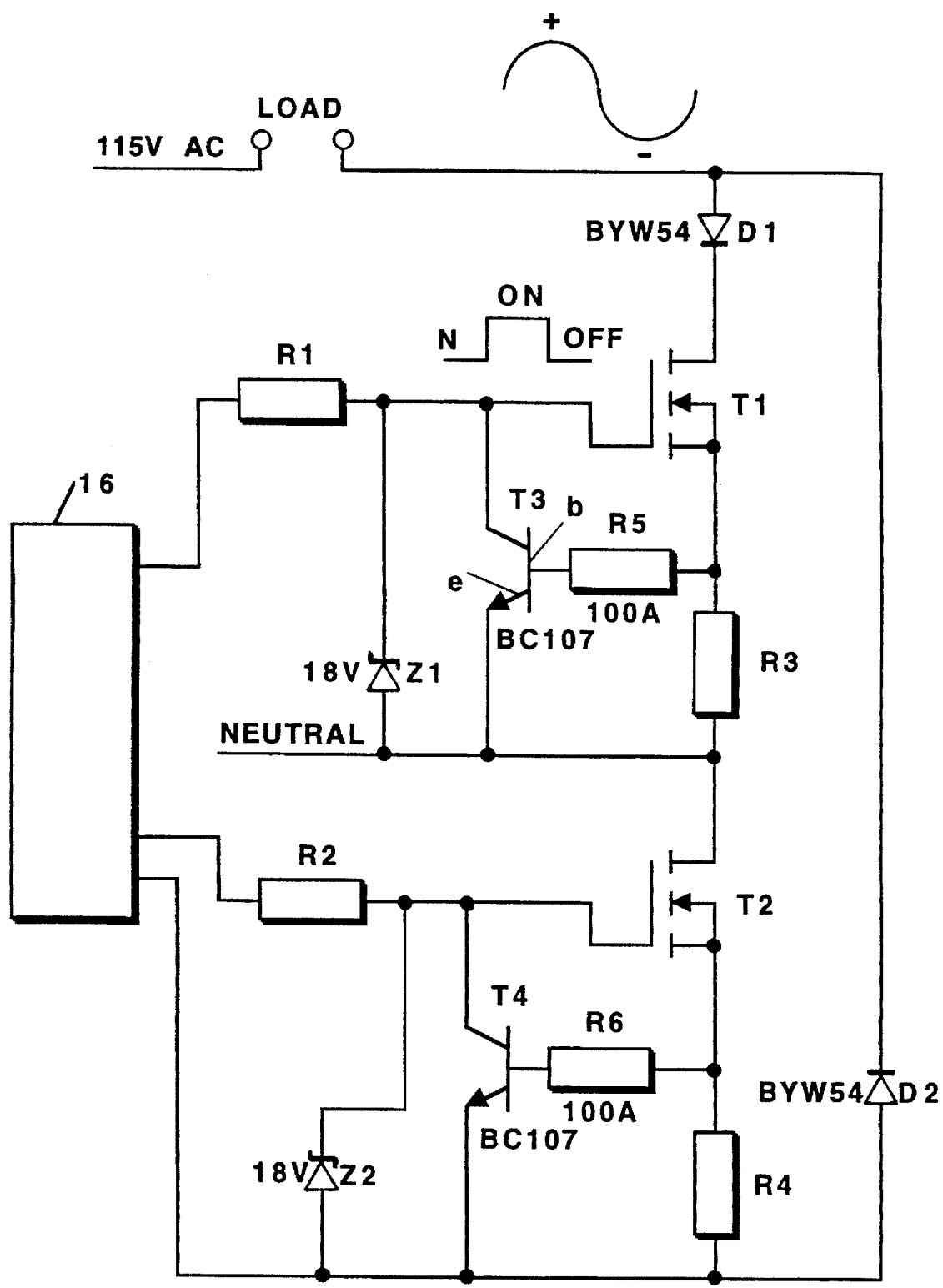

A specific embodiment of the invention will now be described, by way of example, with reference to the accompanying drawings in which:

FIG. 1 shows a block diagram of a light controller in accordance with the invention;

FIGS. 2a, 2b, 2c, and 2d are waveforms representative of signal processes at 18, driver 16 and lights 1 (twice) used in the light controller shown in FIG. 1; and FIG. 3 shows a circuit diagram of the A.C. power switch shown in FIG. 1.

With reference to FIG. 1, an array of eight electroluminescence formation lights 1 are controlled by a lighting controller 2 (within the broken lines). A 115 V, 400 Hz supply is connected to the input of the controller via supply and return ports 3 and 4, the lighting controller 2 and lights 1 being activated and controlled by a cockpit mounted 10K ohm linear potentiometer 5 incorporating a 5 amp switch 6.

The lighting controller 2 comprises a 115 V A.C. power rail 7 and a return rail 8 connected to the supply and return parts 3 and 4. A low voltage supply 9 provides a +15 V D.C. supply to the controller components.

A rectifier 10 rectifies the A.C. power waveform to give a full wave rectified output 11 of peak voltage 115 V. The zero crossing points of the voltage waveform are automatically derived in this rectification. The rectified output 11 is input to an attenuator 12 where it is reduced in amplitude before being passed to a comparator 13 where it is compared with a D.C. level set by the linear potentiometer 5.

The linear potentiometer 5 is supplied with a +5 V D.C. supply derived from the +15 V D.C. supply by a POT D.C. supply 14. Thus, by rotation of the potentiometer 5 the D.C. voltage level on input 15 to the comparator 13 can be varied between 0 V and +5 V.

The comparison process will be described later but the result is a pulse width modulated output which is passed via an output driver 16 to a A.C. Power Switch 17. The purpose of the output driver 16 is to isolate the low voltage circuitry from the high voltages present in the power switch 17. It achieves this with an electro-optical coupler in a manner well known.

The power switch 17 switches the formation lights 1 on for the duration of each pulse by completing the connection to the return rail 8. Thus it is the width of each pulse which controls the light output, the frequency of the pulses being too great for the human eye to detect the on and off periods. The width of the pulses is set by the comparator 13 in the following way.

FIG. 2a shows the rectified and attenuated voltage waveform 18 generated by the rectifier 10 and attenuator 12. $P_1$ is the DC voltage level set by the linear potentiometer 5 on input 15 to the comparator 13. The comparator 13 determines where these voltages are equal that is to say where the waveforms $p_1$ and 18 intersect. The points of intersection are marked as $i_1$ to $i_6$ on FIG. 2a. When the comparator 13 detects intersection $i_1$, it produces +15 V on its output to the output driver 16 (see FIG. 2B). This level is maintained until $i_2$ is detected and the level is switched to 0v producing a pulse p1 symmetrical about zero-crossing point $z_1$. The level is switched to a +15 V at the next intersection $i_3$ and switched to 0v at $i_4$ to produce pulse $p_2$ symmetrical about zero-crossing point $z_2$. Similarly, intersections $i_5$ and $i_6$ produce $p_3$ symmetrical about zero crossing point $z_3$.

The broken lines in FIGS. 2a and 2b show the pulses generated by the intersection of a higher DC level $P_2$ set by the linear potentiometer 5. The width of these pulses is wider than that set at the lower level $p_1$ giving a longer period for the lights 1 and hence a higher light output. It should be noted the brilliance is thus increased by widening the pulse from the zero-crossing points of the voltage curve.

FIG. 2c shows the voltage at the load, that is to say, the lights 1. Considering this curve from pulse $p_1$, the supply 115 V A.C. is connected to the load during the width of $p_1$, points a and b on the V load curve. At b the connection is broken but because of the high capacitance of the load, the voltage remains almost constant decaying only slightly. Between c and d, corresponding to pulse $p_2$, the 115 V A.C. is again connected, this time on its positive cycle. Again during the interpulse period, the load is disconnected and the voltage remains almost constant. Thus the voltage at the load follows the full 115 V A.C. supply only for the duration of the pulses as shown in FIG. 2c. As the pulse width is increased, more of the full 115 V A.C. supply is applied to the load until full power is applied.

By symmetrically "widening" the pulses about the zero-crossing points of the voltage waveform, the current flow as shown by the solid line in FIG. 2d conforms to the supply current shown in broken outline.

The relationship between the rate of widening of the pulses and the rate of operation of the potentiometer 5 is approximately logarithmic, as determined by the characteristic of the rectified a.c. waveform. Thus the requirement for an expensive logarithmic potentiometer to match the logarithmic response of the eye to the light output, is avoided.

The power switch 17 is shown in greater detail in FIG. 3 and it comprises in the main two power transistors $T_1$ and $T_2$ for switching alternate cycles of the voltage waveform. Diodes $D_1$ and $D_2$ ensure a unidirectional current flow through $T_1$ and $T_2$ respectively. $R_1$ ensures the correct bias for transistor $T_1$ while $R_2$ performs the same function for $T_2$.

In response to an output pulse from output driver 16, transistors $T_1$ and $T_2$ will be turned on. If the voltage waveform is in its positive cycle current will flow from the 115 A.C. line 7 through the load via diode $D_1$, $T_1$ and $R_3$ to the neutral line. Diode $D_2$ will prevent a current flow through $T_2$ during the positive cycle.

During the negative half of the cycle, current will flow from the neutral line via $T_2$, $R_4$ and $D_2$ through the load to the 115 V A.C. line 7. Diode $D_1$ prevents current flow through $T_1$ during this part of the cycle.

Transistor $T_3$, resistors $R_5$ and $R_3$ perform a current limiting function on $T_1$. As the current increases through $R_3$, the voltage drop across the base b and emitter e of $T_3$ increases until $T_3$ is switched on. The pulse is then shorted to neutral and $T_1$ switched off. Transistor $T_4$, resistors $R_6$ and $R_4$ perform the same function on $T_2$.

Zener diodes $Z_1$ and $Z_2$ provide reverse power protection to $T_3$ and $T_4$ respectively. In the event of an applied reverse voltage exceeding the breakdown voltage of the zener diodes, $Z_1$ and $Z_2$, these diodes conduct. Zener diodes $Z_1$ and $Z_2$ are 18 V diodes.

In alternative embodiments of the invention, the rectifier, attenuator and comparator may be replaced by other means to generate a waveform symmetrical about the zero-crossing points of the A.C. voltage to be controlled. It may also be possible to produce pulses from a halfwave rectified A.C. waveform in a similar manner to the way in which pulses were produced from a full wave rectified A.C. waveform as earlier described.

We claim:

1. A system comprising an A.C. power supply controller having input terminals for connection to an A.C. power supply, and a plurality of electroluminescent light sources powered from the controller, characterised in that the controller comprises means for producing a pulsed switching waveform centred on the zero-crossing points of an applied alternating voltage waveform measured across said input terminals, powerswitch means for connecting an applied voltage waveform to the light source in response to the pulsed switching waveform, and means for widening the pulse width of the switching waveform symmetrically about the zero-crossing points to vary the power applied to the light source.

2. A controller as claimed in claim 1 wherein the means (10 to 15) for producing a pulsed switching waveform (p) includes a rectifier (10) for producing a rectified waveform (11) from the applied alternating voltage waveform.

3. A controller as claimed in claim 2 or 3 in which the rectifier (10) is a full-wave rectifier.

4. A controller as claimed in claim 2 or 3 wherein the means (10 to 15) for producing a pulsed switching waveform (p) includes a comparator (13) for comparing the rectified waveform (11) with a control D.C. input level (15) and producing an output level between adjacent crossing points (i) of the control D.C. input level (15) and the rectified waveform (11) about the zero-crossing points (z).

5. A controller as claimed in claim 4 in which the means (5) for widening the pulse width of the switching waveform comprises means controlling the input level (15).

6. A controller as claimed in claim 5 in which said means (5) comprises a linear potentiometer.

7. A controller as claimed in any one of the preceding claims in which the applied alternating voltage waveform is that waveform applied to the load by the powerswitch means (17).

8. An A.C. power supply controller as claimed in any one of the preceding claims and a capacitive load (1) to which the powerswitch means (17) connects the applied voltage waveform.

* * * * *

UNITED STATES PATENT AND TRADEMARK OFFICE
CERTIFICATE OF CORRECTION

PATENT NO. : 5,489,839
DATED : February 6, 1996
INVENTOR(S) : David G. Burns and Victor L. Shannon Page 1 of 2

It is certified that error appears in the above-indentified patent and that said Letters Patent is hereby corrected as shown below:

Column 4, line 14, "A controller", should read --A system--.

Column 4, line 18, "A controller", should read --A system--.

Column 4, line 18, "claim 2 or 3", should read --claim 2--.

Column 4, line 20, "A controller", should read --A system--.

Column 4, line 20, "claim 2 or 3", should read --claim 2--.

Column 4, line 27, "A controller", should read --A system--.

Column 4, line 30, "A controller", should read --A system--.

Column 4, line 32, "A controller", should read --A system--.

Column 4, line 32-33, "in any one of the preceding claims", should read --in claim 1--.

UNITED STATES PATENT AND TRADEMARK OFFICE
CERTIFICATE OF CORRECTION

PATENT NO. : 5,489,839
DATED : February 6, 1996
INVENTOR(S) : David G. Burns and Victor L. Shannon It is certified that error appears in the above-identified patent and that said Letters Patent is hereby corrected as shown below:

Column 4, lines 36-39, "An A.C. power supply controller as claimed in any one of the preceding claims and a capacitive load (1) to which the powerswitch means (17) connects the applied voltage waveform.", should read --A system as claimed in claim 1 in which the means (5) varies the power applied to the light source (1) from zero to a maximum power level.

Signed and Sealed this

Seventeenth Day of November, 1998

*Attest:*

BRUCE LEHMAN

*Attesting Officer*     *Commissioner of Patents and Trademarks*